Patented Dec. 28, 1948

2,457,328

UNITED STATES PATENT OFFICE 2,457,328

1,2-EPOXIDES AND PROCESS FOR THEIR PREPARATION

Daniel Swern and Geraldine N. Billen, Philadelphia, Pa., assignors to the United States of America as represented by the Secretary of Agriculture No Drawing. Application May 28, 1946, Serial No. 672,906

6 Claims. (Cl. 260—348)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to long-chain, aliphatic 1,2-epoxides, and more particularly, to 1,2-epoxytetradecane having the formula

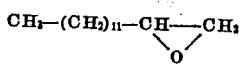

and to 1,2-epoxyoctadecane having the formula

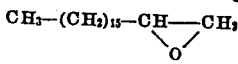

and to a process for their preparation.

According to the invention, 1,2-epoxytetradecane is prepared by oxidizing 1-tetradecene with a peracid such as perbenzoic acid, and peracetic acid in acid solution. Similarly, 1,2-epoxyoctadecane is prepared by oxidizing 1-octadecene with peracetic acid in acid solution.

The following examples are illustrative of the invention:

Example I

A mixture of 49.1 grams (0.25 mole) of 1-tetradecene, 332 grams of 0.9 M peracetic acid in glacial acetic acid solution, and 100 ml. of glacial acetic acid, was heated and stirred at about 25° C. for about 28 hours, and the reaction mixture then poured into cold water, precipitating a semi-solid product. The semi-solid product was separated from this aqueous mixture and then dissolved in ether. The ether solution was dried, and the ether then evaporated. The residue was fractionally distilled, and there was obtained a 42 percent yield of substantially pure 1,2-epoxytetradecane having a boiling point of 95° to 96° C. at 0.4 mm. of mercury, and a refractive index (Abbe), $[n]_D^{20}$, of 1.4405. Analysis of the material for epoxy oxygen gave the following results: calculated for 1,2-epoxytetradecane—7.54 percent; found—7.53 percent.

Example II

A mixture of 50.5 grams (0.2 mole) of 1-octadecene, 276 grams of 0.87 M peracetic acid in glacial acetic acid solution, and 100 ml. of glacial acetic acid was heated and stirred at about 25° C. for about 28 hours, and the reaction mixture then poured into ice water, precipitating a solid product. The product, which was semi-solid at room temperature, was separated from this aqueous mixture by filtration, and then fractionally distilled to obtain a 44 percent yield of substantially pure 1,2-epoxyoctadecane having a boiling point of about 137° C. at 0.5 mm. of mercury. Analysis of the material for epoxy oxygen gave the following results: calculated for 1,2-epoxyoctadecane—5.96 percent; found—4.81 percent.

1,2-Epoxytetradecane and 1,2-epoxyoctadecane are useful intermediates for many chemical reactions. For example, upon polymerization they yield water-insoluble polymers which are useful as addition agents to lubricants for the purpose of improving the viscosity index. Thus, polymers prepared from these epoxides differ from those prepared from ethylene- and propylene oxide, and other short-chain epoxides, in that they are substantially completely insoluble in water. For many uses, insolubility in water is an advantage.

Having thus described our invention, we claim:

1. A 1,2-epoxide selected from the group consisting of 1,2-epoxytetradecane and 1,2-epoxyoctadecane.
2. 1,2-epoxytetradecane.
3. 1,2-epoxyoctadecane.
4. A process of preparing an epoxide selected from the group consisting of 1,2-epoxytetradecane and 1,2-epoxyoctadecane, respectively, comprising reacting in glacial acetic acid solution a member selected from the group consisting of 1-tetradecene and 1-octadecene, respectively with peracetic acid at a temperature of about 25° C. for about 28 hours, and then isolating the formed epoxide.
5. A process of preparing 1,2-epoxytetradecane comprising reacting 1-tetradecene with peracetic acid in glacial acetic acid solution at a temperature of about 25° C. for about 28 hours, and then isolating the formed epoxide, which comprises mainly 1,2-epoxytetradecane.
6. A process of preparing 1,2-epoxyoctadecane comprising reacting 1-octadecene with peracetic acid in glacial acetic acid solution at about 25° C. for about 28 hours, and then isolating the formed epoxide, which comprises mainly 1,2-epoxyoctadecane.

DANIEL SWERN.
GERALDINE N. BILLEN.

REFERENCES CITED

The following references are of record in the file of this patent:

UNITED STATES PATENTS

| Number | Name | Date |
|---|---|---|
| 2,159,507 | Law | May 23, 1939 |
| 2,411,762 | Swern | Nov. 26, 1946 |

OTHER REFERENCES

Gilman-Organic Chemistry, vol. I, pages 634 and 635—1943.